Sept. 7, 1937.   F. E. JEFFERS   2,092,279
DIGGING IMPLEMENT
Filed July 9, 1936
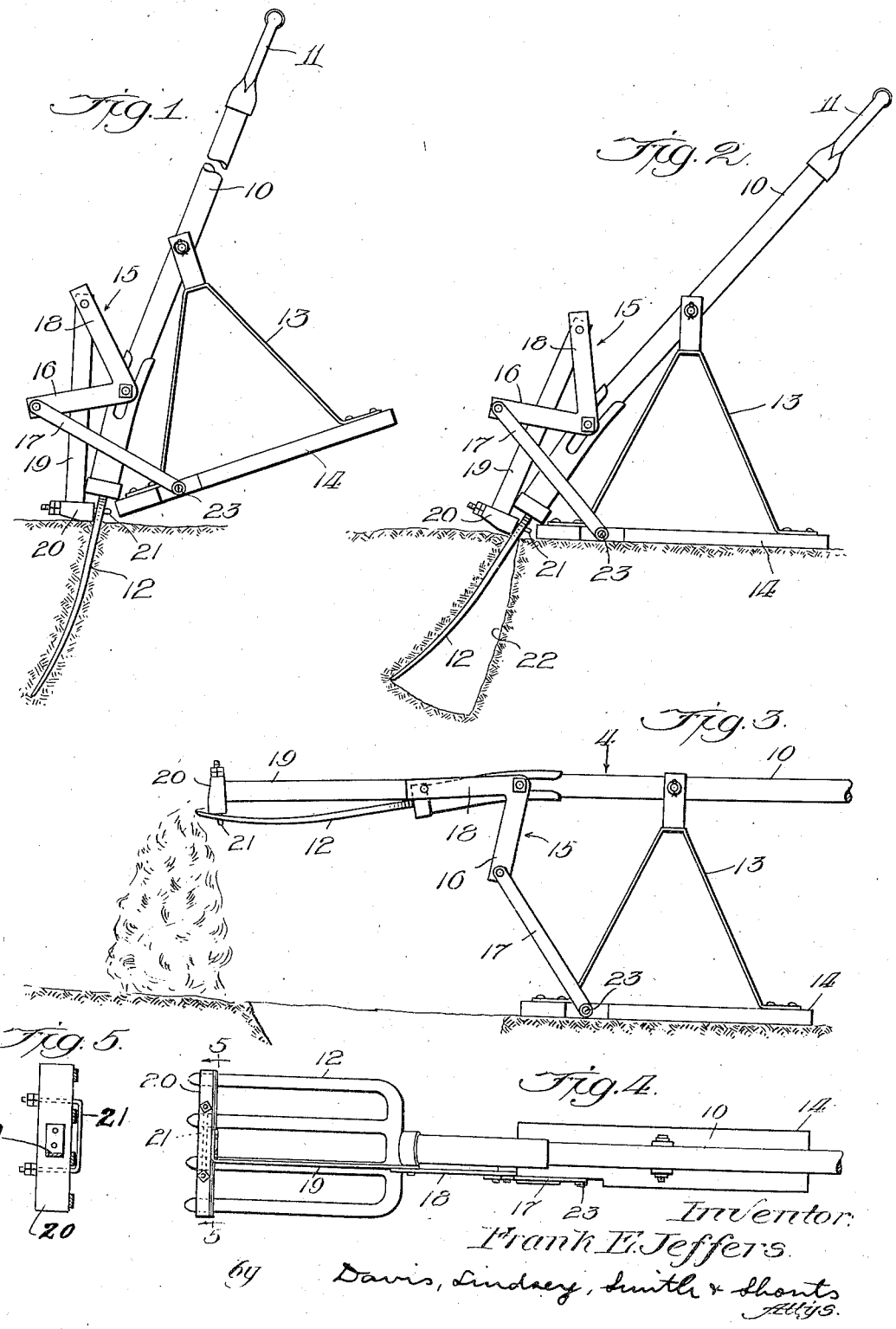

Patented Sept. 7, 1937

2,092,279

UNITED STATES PATENT OFFICE 2,092,279

DIGGING IMPLEMENT

Frank E. Jeffers, Glen Ellyn, Ill.

Application July 9, 1936, Serial No. 89,741

6 Claims. (Cl. 254—131.5)

My invention relates to a digging implement and is primarily concerned with a device that requires a minimum effort for excavation and removal of the excavated load.

The present invention constitutes an improvement on the standard type of digging implement, such as a spade, shovel or fork because of the reduction in muscular effort and time required to perform any digging operation. The use of the ordinary shovel places an excessive burden on the back and arm muscles, since except for the slight fulcruming action of the shovel blade in the early stage of excavation, virtually the entire effort is in the nature of a lift of the shovel and its load, the latter being thereafter dislodged by a tossing action which is also fatiguing.

It is therefore one object of my invention to devise a digging implement which is constructed and arranged to reduce the effort required to lift the excavated load by fulcruming the implement handle on the surface of the soil.

A further object is to provide an implement of the character indicated which includes devices that eliminate the necessity of discharging the shovel load by the usual swinging or tossing movement of the shovel, but accomplishes this result automatically when the load has been raised a predetermined distance out of the excavation.

A further object is to provide an implement whose weight is only slightly in excess of a standard implement so that changes in position may be easily effected, and whose fulcrum elevation above the ground is located so as to require less bending of the body than present devices.

These and further objects of my invention will be set forth in the following specification, reference being had to the accompanying drawing, and the novel means by which said objects are effectuated will be definitely pointed out in the claims.

In the drawing:

Figure 1 is a side elevation of my improved implement, showing the position thereof when the ground-inserting part has been forced into the soil, or, in other words, the first step in the use of the implement.

Fig. 2 is a view showing the implement rocked to a position in which the foot thereof is resting on the surface of the ground, the ground-inserting part of the implement being moved to a position in which it is beginning to raise the excavated load.

Fig. 3 shows the third step in the use of the implement in which it has been moved to a substantially horizontal position and the excavated load has been discharged clear of the excavation.

Fig. 4 is a plan view, looking generally in the direction of the arrow 4 in Fig. 3.

Fig. 5 is a section along the line 5—5 in Fig. 4, looking in the direction of the arrows, showing the manner in which the load discharging device is guidably associated with the tines of the fork which is generically representative of any form of digging implement with which my improved arrangement may be associated.

Referring to the drawing, the numeral 10 designates the usual handle of a spading or digging fork which is provided with a hand grip 11 and a fork or ground-inserting part 12. A brace 13 is pivotally connected to a convenient portion of the handle 10 between the grip 11 and the fork 12 and has also attached thereto a foot 14 whose area may be such as to provide for an adequate support for the fulcruming action of the implement as hereinafter described.

A bell crank lever 15 is pivotally attached to the handle 10, preferably adjacent the fork end of the implement, and one arm 16 thereof is connected by means of a link 17 to the foot 14, while the other arm 18 thereof is connected by means of a link 19 to a pusher or load discharging device 20 which extends transversely and completely across the tines of the fork 12 and, when in retracted position, is located close to the adjacent end of the handle 10.

In order to retain the pusher 20 in working relation to the tines of the fork, a U-shaped guide 21 is preferably looped around the intermediate tines and is fastened to the pusher.

In using my improved implement, the fork 12 is first inserted in the ground in the more or less upright position illustrated in Fig. 1 and, at this time the foot 14 occupies generally the angular position, relative to the ground, as also illustrated in the same figure. Preferably, the parts are so arranged that, in the foregoing position, that end of the foot 14 which is located close to the fork 12 occupies a position actually touching or close to the surface of the ground.

The operator then rocks the implement to the position illustrated in Fig. 2, in which the foot 14 is rested directly on the ground surface. At this time, the fork 12 has moved to the position illustrated in Fig. 2 and has therefore begun to raise the load from the excavation 22. However, this rocking movement of the implement is not sufficient to cause any appreciable movement of the pusher 20.

Continued rocking movement of the implement finally raises the excavated load clear of the excavation 22 and, due to the fixed position of the pivot 23 on the link 17, this link will rock the bell crank lever 15 in a counterclockwise direction and effect a traverse of the pusher 20 from the position illustrated in Fig. 1 to that illustrated in Fig. 3, thus discharging the excavated load clear of the excavation. During this action the arm 16, being shorter than the arm 18, clears the handle end of the fork while the arm 18 contacts the fork, as shown in Fig. 3, and acts as a stop to limit the discharging movement of the pusher. The guide 21 prevents any inadvertent movement of the pusher away from the fork and retains the pusher in close working relation to the fork so as to perform its primary function. The operator may then rock the handle 10 in the opposite direction to return the pusher to its initially retracted position, after which the implement may be lifted and the fork then inserted in a new location, the implement then occupying the position illustrated in Fig. 1.

The implement is highly useful for the purpose of digging trenches, individual holes, or the spading or loosening of ground preparatory to gardening. It will be particularly noted that at no time is the burden placed upon the operator of actually lifting the load by an action or movement comparable to that required in the use of the ordinary spade. Merely a rocking movement of the handle 10, which may be accomplished by one hand, serves to lift the load and, in so doing, the operator is benefited by the obvious lever action present which reduces the muscular effort required. Preferably, the height of the brace 13 is so adjusted that no excessive bending on the part of the operator is required.

The invention is not restricted to the use of a digging fork, as illustrated, but is also capable of adaptation to digging implements in general, such as spades and shovels.

I claim:

1. The combination with a digging implement having a handle and a ground inserting part, of a foot pivotally connected to the handle and adapted to rest on the ground as a fulcrum, a load discharging device shiftable across the face of the part, and lever means pivoted on the handle and connected to the foot and device, the means being operable by the rocking movement of the handle in a load raising direction for actuating the device.

2. The combination with a digging implement having a handle and a ground inserting part, of a foot pivotally connected to the handle and adapted to rest on the ground as a fulcrum, discharging means shiftable across the face of the part between positions adjacent the handle and at the extremity of the part for removing the excavated load, and lever means pivoted on the handle and connected to the foot and device, the means being operable by the rocking movement of the handle in one direction for actuating the discharge means to remove the load and in the opposite direction to retract the discharge means.

3. The combination with a digging implement having a handle and a ground inserting part, of a foot pivotally connected to the handle and adapted to rest on the ground as a fulcrum, a load discharging device shiftable across the face of the part, lever means pivoted on the handle, and links connecting the lever means to the foot and device respectively, for actuating the device during the raising of the excavated load by the rocking movement of the handle.

4. The combination with a digging implement having a handle and a ground inserting part, of a foot pivotally connected to the handle and adapted to rest on the ground as a fulcrum, a V-shaped lever pivoted at its vertex on the handle, a load discharging device positioned to traverse the face of the part, and links pivotally connecting the lever arms with the device and foot, all respectively, whereby the rocking movement of the handle in a load-raising direction actuates the device to discharge the load.

5. The combination with a digging implement having a handle and a ground inserting fork, of a foot pivotally connected to the handle and adapted to rest on the ground as a fulcrum, a load discharging device shiftable across the face of and guidably connected to the tines of the fork, and lever means pivoted on the handle and connected to the foot and device, the means being operable by the rocking movement of the handle in a load raising direction for actuating the device.

6. The combination with a digging implement having a handle and a ground inserting fork, of a foot pivotally connected to the handle and adapted to rest on the ground as a fulcrum, a load discharging device extending transversely of and shiftable across the face of the fork, guiding means fastened to the device and looped around certain of the tines of the fork, and lever means pivoted on the handle and connected to the foot and device, the means being operable by the rocking movement of the handle in a load-raising direction for actuating the device.

FRANK E. JEFFERS.